(12) United States Patent
Bassett et al.

(10) Patent No.: US 9,149,000 B2
(45) Date of Patent: Oct. 6, 2015

(54) BOGIE AXLE FOR A MACHINE

(71) Applicant: Kuhn North America, Inc., Brodhead, WI (US)

(72) Inventors: William J. Bassett, Brodhead, WI (US); Daniel R. Brauer, Beloit, WI (US); Matthew J. Flood, Albany, WI (US); John Joseph Jewison, Brodhead, WI (US); Jeffrey Marggi, Oregon, WI (US)

(73) Assignee: KUHN NORTH AMERICA, INC., Brodhead, WI (US)

( * ) Notice: Subject to any disclaimer, the term of this patent is extended or adjusted under 35 U.S.C. 154(b) by 168 days.

(21) Appl. No.: 13/839,920

(22) Filed: Mar. 15, 2013

(65) Prior Publication Data

US 2014/0265198 A1    Sep. 18, 2014

(51) Int. Cl.
*B60B 37/10* (2006.01)
*A01D 78/14* (2006.01)
*A01D 80/00* (2006.01)

(52) U.S. Cl.
CPC .............. *A01D 78/144* (2013.01); *A01D 80/00* (2013.01); *Y10T 29/49716* (2015.01)

(58) Field of Classification Search
CPC . A01D 78/144; A01D 80/00; Y10T 29/49716
USPC ........ 280/676, 682, 28.5, 788, 80.1, 124.116, 280/124.11; 180/209
See application file for complete search history.

(56) References Cited

U.S. PATENT DOCUMENTS

| | | | | | |
|---|---|---|---|---|---|
| 1,856,068 | A | * | 5/1932 | Christie | 180/9.56 |
| 2,044,278 | A | * | 6/1936 | Buquor | 89/40.01 |
| 2,804,157 | A | * | 8/1957 | Preston | 180/340 |
| 4,462,477 | A | * | 7/1984 | Mastro | 180/24.02 |
| 4,819,956 | A | * | 4/1989 | Campbell | 280/203 |
| 4,932,197 | A | * | 6/1990 | Allen | 56/377 |
| 5,199,252 | A | * | 4/1993 | Peeters | 56/377 |
| 5,339,611 | A | * | 8/1994 | Roderfeld et al. | 56/10.2 R |
| 5,752,871 | A | * | 5/1998 | Tsuzuki | 446/457 |
| 6,272,826 | B1 | * | 8/2001 | Menichetti et al. | 56/367 |
| 6,416,136 | B1 | * | 7/2002 | Smith | 301/128 |
| 6,543,861 | B1 | * | 4/2003 | Kahle et al. | 305/143 |
| 6,758,535 | B2 | * | 7/2004 | Smith | 301/128 |
| 7,510,197 | B2 | * | 3/2009 | Gottschalk | 280/86.5 |
| 7,832,812 | B1 | * | 11/2010 | Scott | 301/130 |
| 8,016,068 | B2 | * | 9/2011 | Daniel et al. | 180/306 |
| 8,146,338 | B1 | | 4/2012 | Cicci et al. | |
| 8,272,647 | B2 | * | 9/2012 | Pendl | 280/7.12 |

(Continued)

OTHER PUBLICATIONS

Kuhn, SR SpeedRake® Wheel Rakes, SR 300 Brochure.

(Continued)

*Primary Examiner* — Paul N Dickson
*Assistant Examiner* — Joselynn Y Sliteris
(74) *Attorney, Agent, or Firm* — Oblon, McClelland, Maier & Neustadt, L.L.P.

(57) ABSTRACT

An agricultural machine is disclosed. The agricultural machine includes a frame including a first axle on a first side of the frame and a second axle on a second side of the frame; and a bogie axle pivotably mounted on each of the first and second axles of the frame. Each bogie axle includes a body with a front axle disposed at a front end of the body and a rear axle disposed at a rear end of the body. A front tire is mounted on the front axle of each bogie axle and a rear tire is mounted on the rear axle of each bogie axle. The front tire is a different size than the rear tire.

10 Claims, 8 Drawing Sheets

(56) References Cited

U.S. PATENT DOCUMENTS

| | | | |
|---|---|---|---|
| 8,347,991 B2* | 1/2013 | Zuchoski et al. | 180/9.25 |
| 8,430,188 B2* | 4/2013 | Hansen | 180/9.26 |
| 8,601,781 B2* | 12/2013 | Steenhoek et al. | 56/375 |
| 8,733,074 B2* | 5/2014 | Steenhoek et al. | 56/375 |
| 8,801,115 B2* | 8/2014 | Hansen | 305/142 |
| 8,827,013 B2* | 9/2014 | Hansen | 180/9.21 |
| 2008/0084111 A1* | 4/2008 | Rainer | 305/124 |
| 2010/0072733 A1* | 3/2010 | Levi | 280/682 |
| 2010/0206648 A1* | 8/2010 | Kelppe et al. | 180/9.1 |
| 2010/0276990 A1* | 11/2010 | Zuchoski et al. | 305/130 |
| 2013/0181431 A1* | 7/2013 | McMahon et al. | 280/839 |

OTHER PUBLICATIONS

Kuhn, SR SpeedRade® Wheel Rakes, SR600 GII Brochure.

* cited by examiner

BOGIE AXLE FOR A MACHINE

BACKGROUND OF THE INVENTION

1. Field of the Invention

This invention relates to a bogie axle for a machine, in particular an agricultural machine.

2. Description of the Related Art

Agricultural machines are used to perform various agricultural functions. Typically, the agricultural machine operates on a field. These agricultural machines may include hay rakes, shredders, spreaders, plows, and wrappers.

One example of an agricultural machine is a hay rake apparatus 200 shown in FIG. 8. The hay rake 200 includes a wheeled cart 212, which includes a frame 214 and a tongue hitch 216 for attachment to a tractor or towing means (not shown), and a rake arm assembly 218. The wheeled cart 212 further includes one axle on each side thereof. A single tire 220 is mounted on each axle via a plurality of holes 221. The single tire 220 may be mounted on each axle via a hub provided on the axle.

The environment in which the agricultural machine operates over includes obstacles, such as holes, ruts, mounds, and foreign objects. These obstacles may not be visible to the operator of the agricultural machine. In addition, it may be difficult to avoid these obstacles during operation of the vehicle. Thus, the agricultural machine must deal with operating in an environment with such obstacles. During travel, the agricultural machine has to travel over and/or through the obstacles.

These obstacles are especially problematic for an agricultural machine with a single axle tire, as shown in FIG. 8. The agricultural machine with a single axle tire may not be able to roll over and/or through the obstacles. Even if the agricultural machine with a single axle tire is able to pass over or through the obstacle, this may cause damage to the agricultural machine. Difficulty in traveling over and through the obstacles may also reduce the efficiency of the function of the agricultural machine.

SUMMARY OF THE INVENTION

Accordingly, one aspect of the present invention is provide an agricultural machine which addresses the problems of traveling over and/or through obstacles.

For example, one non-limiting embodiment of the present invention may provide an agricultural machine with a bogie axle mounted on the axle, instead of a single tire. The bogie axle may include a body with a front axle at a front end and a rear axle at a rear end. A front tire may be mounted to the front axle and a rear tire may be mounted to the rear axle. In an exemplary embodiment, the size of the tires mounted on the bogie axle are different from each other.

In another embodiment, a method of modifying an agricultural machine from a single axle tire configuration to a bogie axle configuration is provided. The tire may be removed from the axle and a bogie axle may be mounted to the axle. The tire which was previously removed from the agricultural machine may then be mounted onto one of the axles of the bogie axle. Such a method allows the operator to upgrade the agricultural machine to a bogie axle by adding parts without needing to discard anything.

BRIEF DESCRIPTION OF THE DRAWINGS

These and other advantages of the invention will become more apparent and more readily appreciated from the following detailed description of the exemplary embodiments of the invention taken in conjunction with the accompanying drawings where.

DETAILED DESCRIPTION OF THE EXEMPLARY EMBODIMENTS

Figure 1:
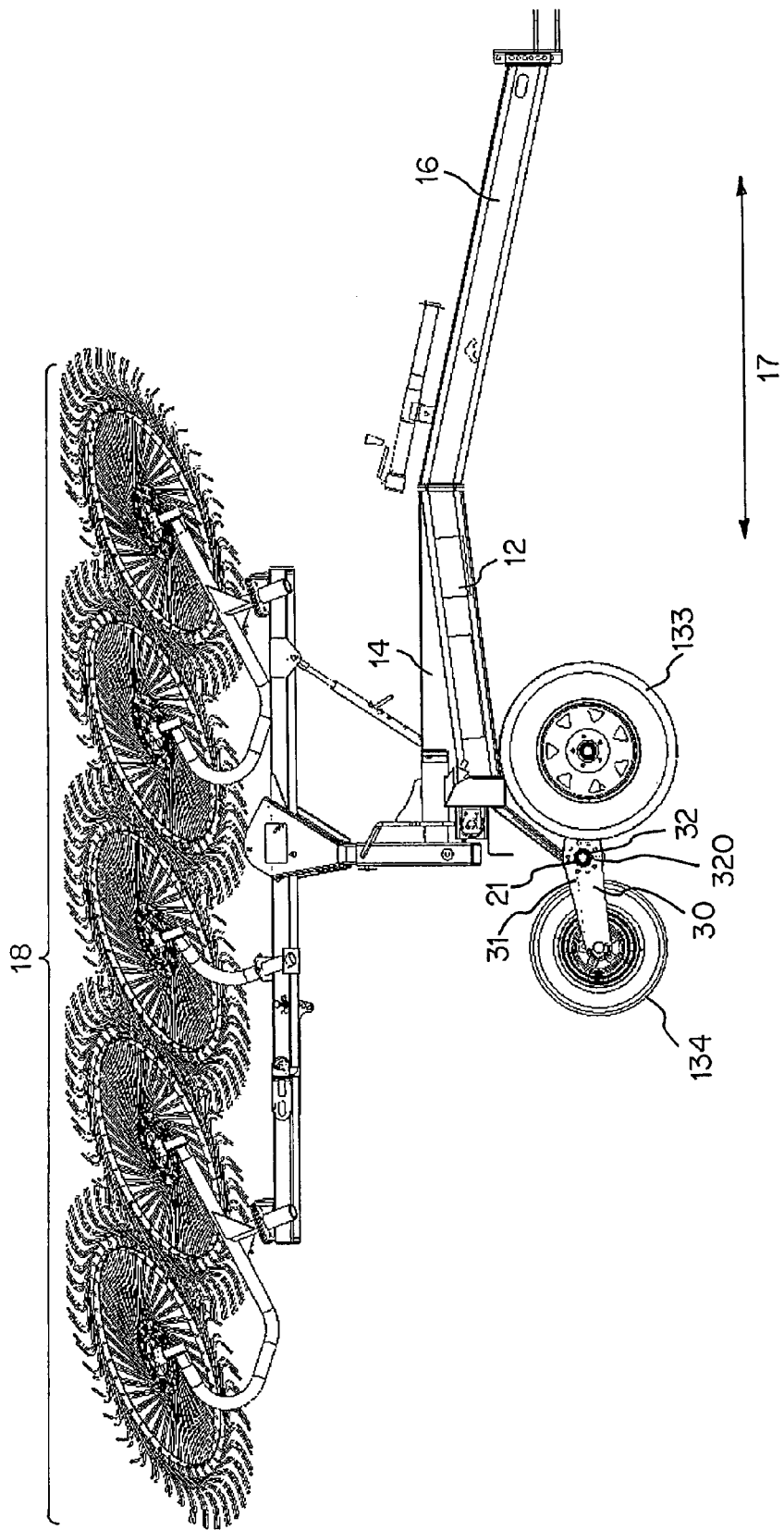
FIG. 1 is a side view of an exemplary embodiment of the present invention.
Figure 2:
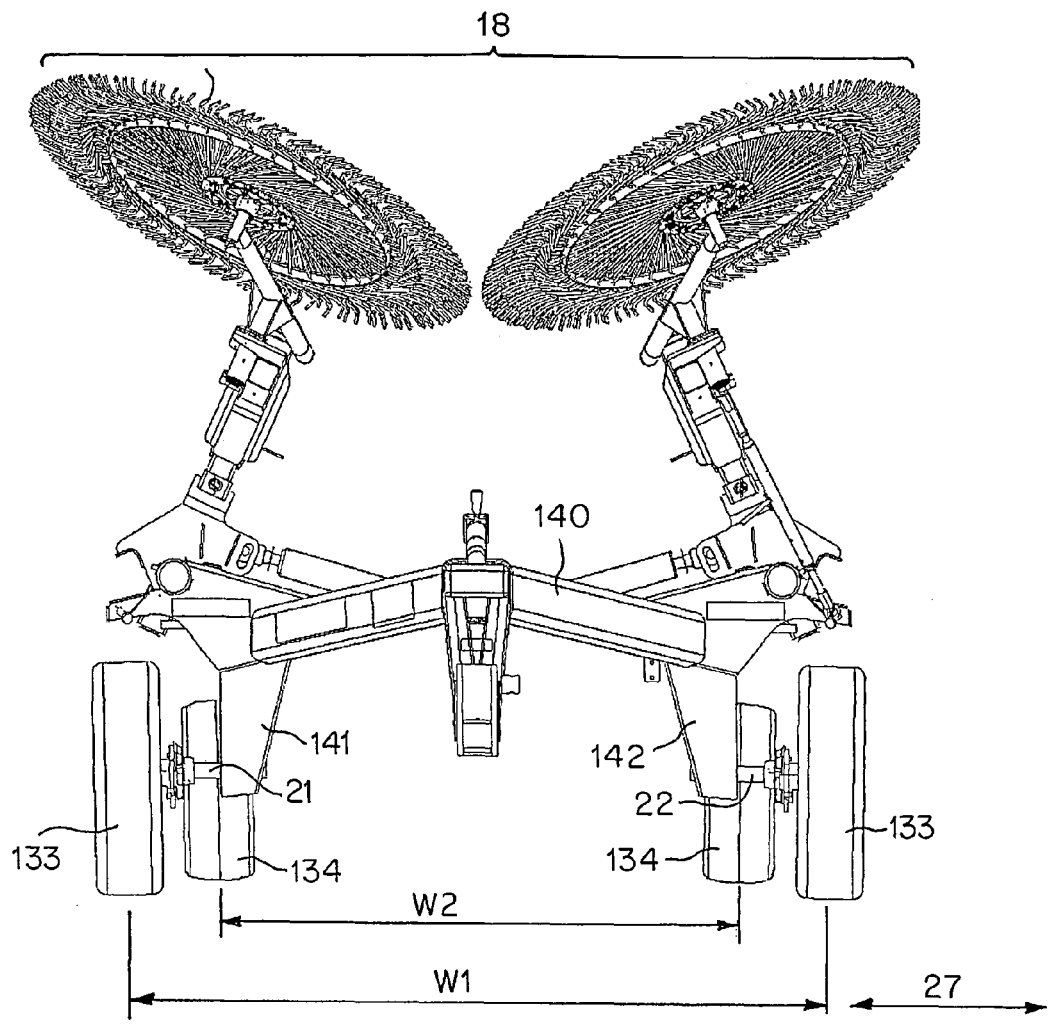
FIG. 2 is a front view of the exemplary embodiment of the present invention.
Figure 3:
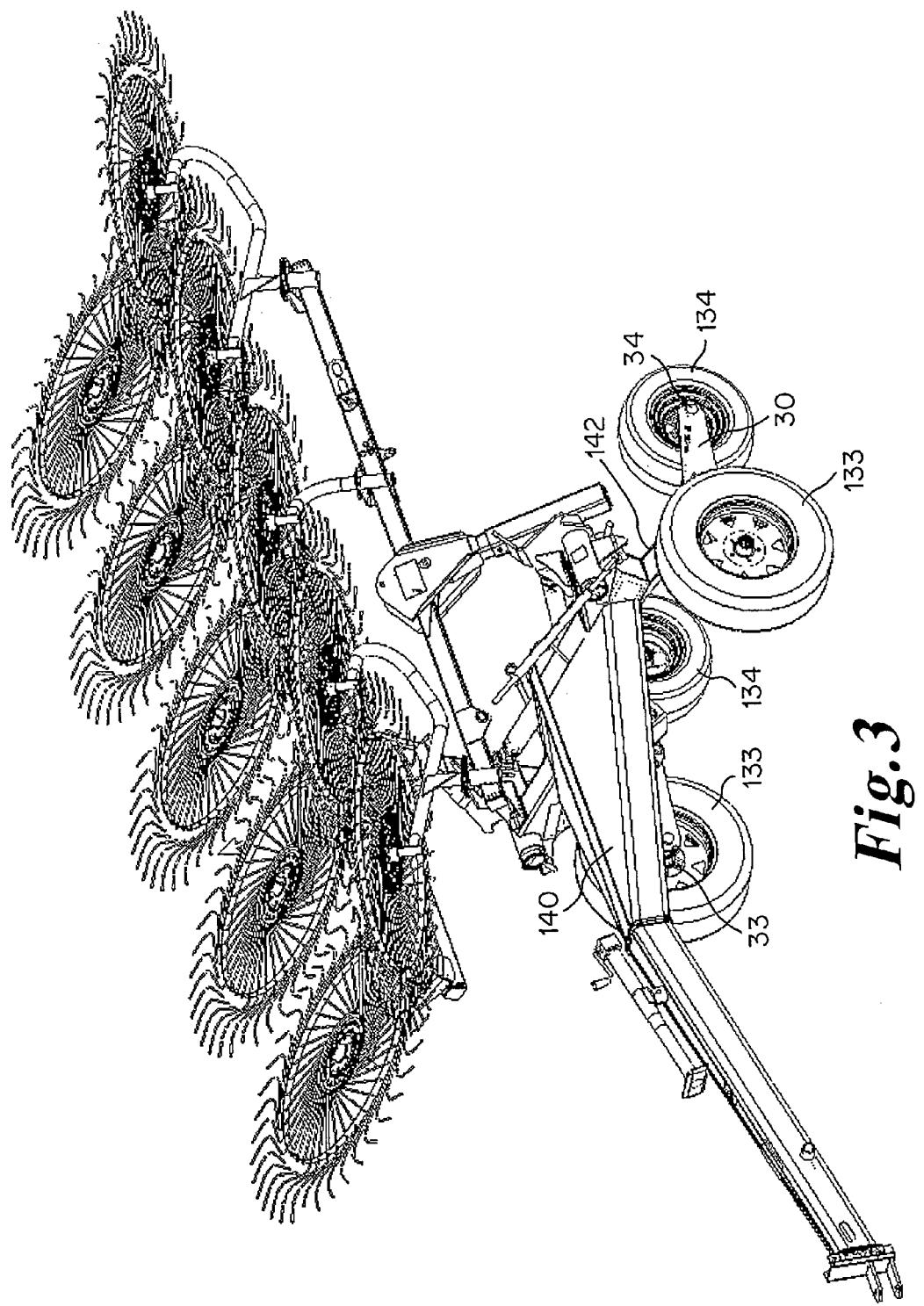
FIG. 3 is an isometric view of the exemplary embodiment of the present invention.
Figure 4:
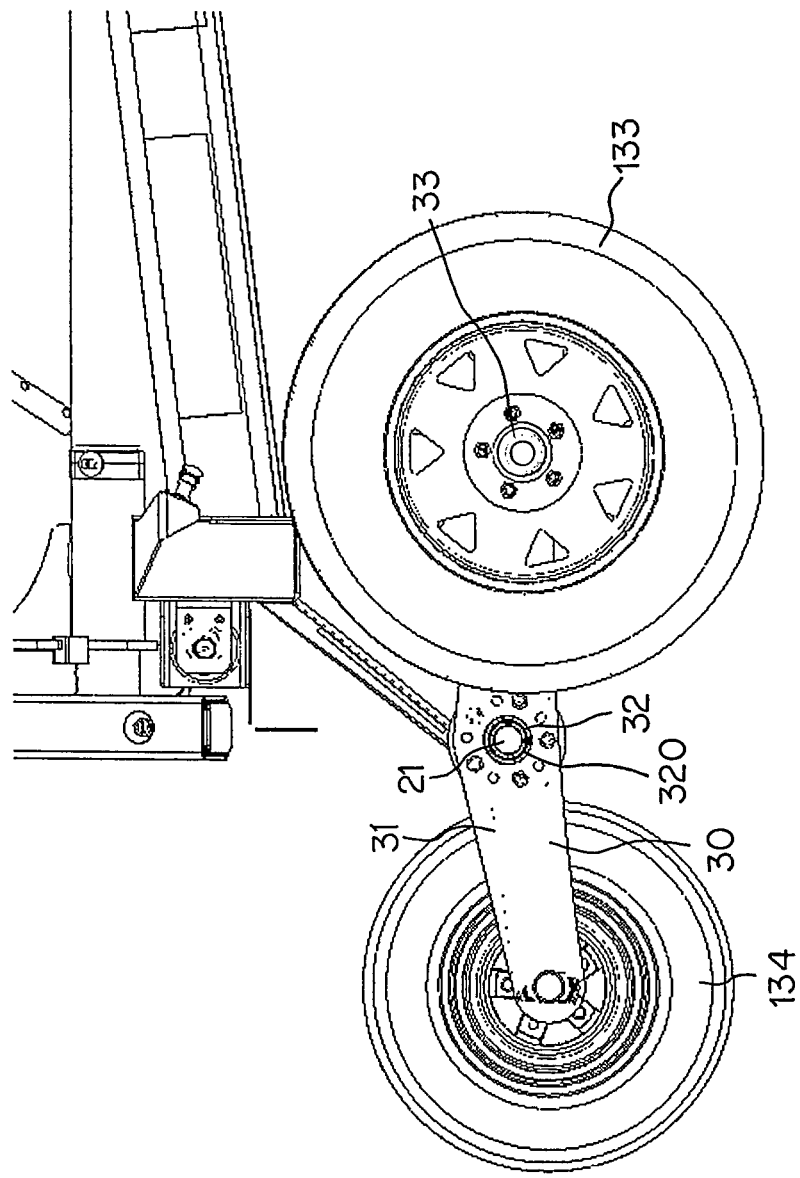
FIG. 4 is a detailed view of an exemplary embodiment of the present invention.

With reference to FIGS. 1-4, a non-limiting agricultural machine is designated by the reference number 10. The agricultural machine 10 shown in FIGS. 1-4 is a hay rake. The agricultural machine 10 may include a wheeled cart 12, which may include a frame 14 and a tongue hitch 16 for attachment to a tractor or towing means (not shown). The tongue hitch 16 may be oriented along a longitudinal axis 17 which is generally inline with the direction of travel. The agricultural machine 10 may further include a rake arm assembly 18.

The frame 14 may include a central portion 140 and lateral side portions 141, 142 which may extend from the central portion 140. Each of the side portions 141, 142 may include an axle 21, 22. The axles 21, 22 may extend from the side portions 141, 142 in a direction 27 which is transverse to the longitudinal axis 17. A hub may be provided on each axle 21, 22.

Figure 5:
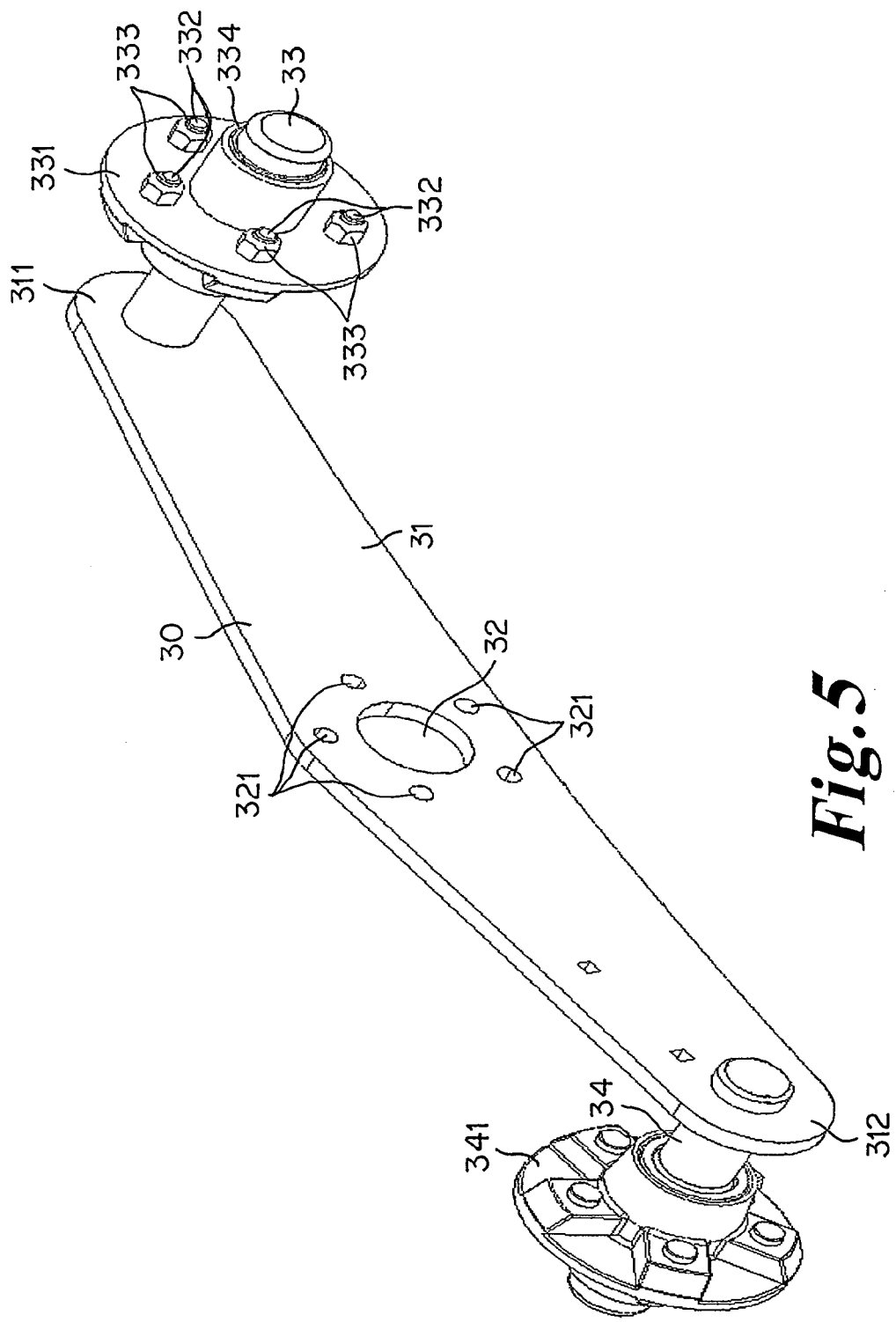
FIG. 5 is an isometric view of an example of an exemplary embodiment of a bogie axle of the present invention.
Figure 6:
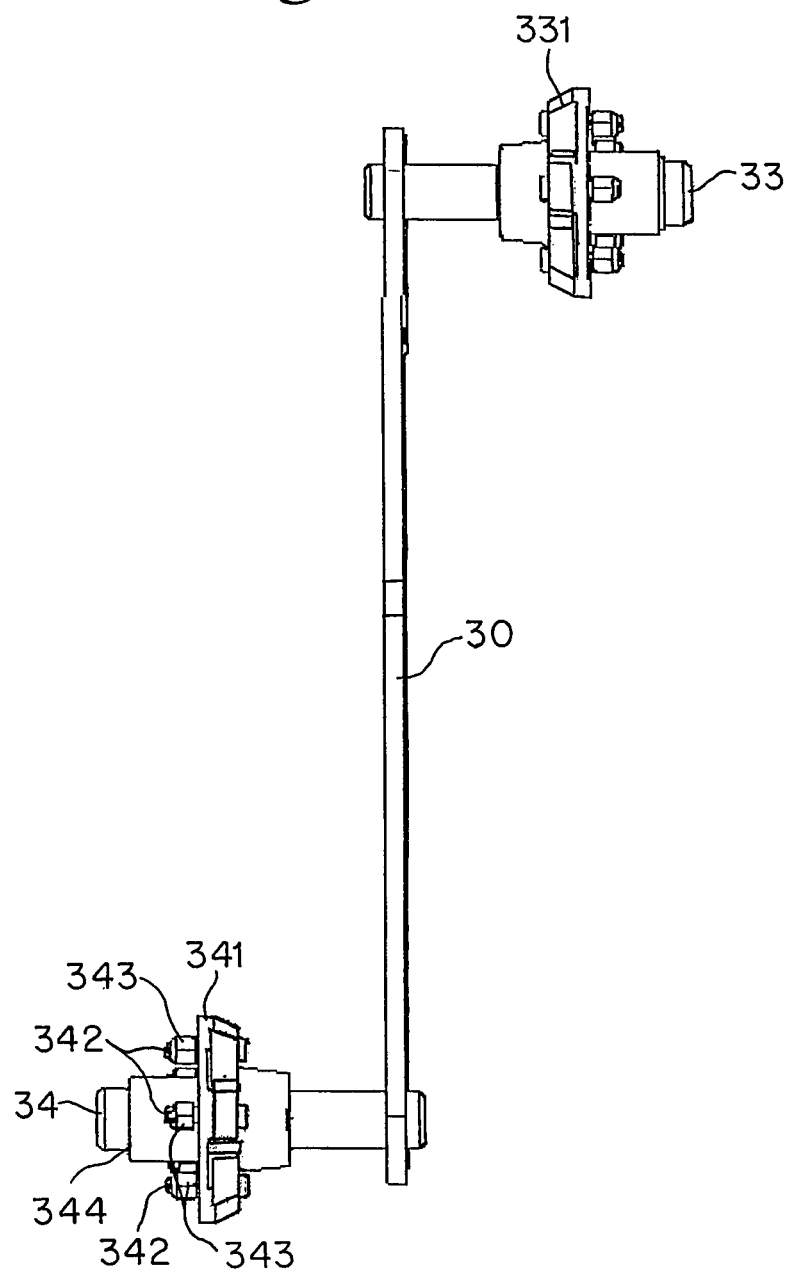
FIG. 6 is a top view of an example of an exemplary embodiment of a bogie axle of the present invention.

A bogie axle 30 may be mounted to each of the axles 21, 22. As shown in FIG. 5, the bogie axle 30 includes a rigid body 31. In one embodiment, the body 31 may have a substantially flat bottom portion and a top portion including a first angled segment and a second angled segment. The body 31 has a first longitudinal end 311 and a second longitudinal end 312. A hole 32 may be provided in the body 31 of the bogie axle 30 between the first end 311 of the body 31 and the second end 312 of the body 31 for mounting onto one of the axles 21, 22. A bearing 320 may be disposed in the hole 32 to allow the bogie axle 30 to pivot about the one of the axles 21, 22 to which the bogie axle 30 is mounted.

The body 31 of the bogie axle 30 may further include a plurality of holes 321 for mounting the bogie axle 30 to the hubs for each axle 21, 22. The plurality of holes 321 may be disposed around the hole 32. The plurality of holes 321 allow the bogie axle 30 to be pivotably mounted to the axles 21, 22 via the hubs. In other words, the bogie axle 30 may be mounted directly to one of the axles 21, 22 or mounted to one of the axles 21, 22 via the respective hub.

A front axle 33 may be provided at the front end 311 of the body 31 of the bogie axle 30. A front hub 331 may be provided on an end of the front axle 33. The front hub 331 may include a plurality of threaded members 332 presenting a bolt pattern. Nuts 333 may be threaded onto each threaded member 332. A front bearing 334 may be provided to allow the front hub 331 to rotate about the front axle 33. A rear axle 34 may be provided at the rear end 312 of the body of the bogie axle 30.

A rear hub 341 may be provided on an end of the rear axle 34. The rear hub 341 may include a plurality of threaded members 342 presenting a bolt pattern. Nuts 343 may be threaded onto each threaded member 342. A rear bearing 344 may be provided to allow the rear hub 341 to rotate about the rear axle 34.

The front axle 33 and the rear axle 34 may extend in the transverse direction 27. In a preferred embodiment of the bogie axle 30, the front axle 33 transversely extends from one side of the body 31 of the bogie axle 30 and the rear axle 34 transversely extends from another side of the body 31 of the bogie axle 30. In other words, in the preferred embodiment, the front axle 33 and the rear axle 34 may extend from opposite sides of the body 31 of the bogie axle 30. However, in another embodiment, the front axle 33 and the rear axle 34 may transversely extend from the same side of the body 31 of the bogie axle 30.

A front tire 133 may be mounted to the front axle 33 of the bogie axle 30 via the front hub 331. A rear tire 134 may be mounted to the rear axle 34 of the bogie axle 30 via the rear hub 341. In one embodiment, the size of the front tire 133 may be different than the size of the rear tire 134. In other words, the front tire 133 may be larger or smaller than the rear tire 134. In another embodiment, the front tire 133 and the rear tire 134 may be the same size.

In one embodiment, the size and/or bolt pattern of the hubs provided on the axles 21, 22 of the agricultural machine 10 may be the same as the size and/or bolt pattern of at least one of the front hub 331 provided at the end of the front axle 33 or the rear hub 341 provided at the end of the rear axle 34 of the bogie axle 30. In another embodiment, the size and/or bolt pattern of the hubs provided on the axles 21, 22 of the agricultural machine 10 is the same as the size and/or bolt pattern of the front hub 331 provided at the end of the front axle 33 and the rear hub provided at the end of the rear axle 34 of the bogie axle 30.

In the preferred embodiment, in which the front axle 33 and rear axle 34 extend from opposite sides of the body 31 of the bogie axle 30, a width W1 between the front tires 133 mounted on the bogie axle 20 may be greater than a width between the rear tires 134 mounted on the bogie axle. This configuration provides an advantage of increased stability during travel of the agricultural machine. In another embodiment, the width W1 may be less than the width W2. In yet another embodiment, the width W1 may be equal to the width W2.

In a preferred embodiment, the front tire 133 may be larger than the rear tire 134. The larger front tire 133 provides advantages in rolling over and/or through obstacles due to its larger size. Also, the rear tire 134 may be smaller due to limited space on the agricultural machine 10.

An agricultural machine 10 with a bogie axle 30 mounted to each of its axles 21, 22 may be better equipped to travel over and/or through obstacles and may provide improved stability during travel of the agricultural machine 10. As the bogie axle 30 may pivot about the axle 21, 22 on which it is mounted, at least one of the front tire 133 and the rear tire 134 mounted on the bogie axle 30 may remain in contact with the ground during travel over and/or through obstacles, thereby improving the travel of the agricultural machine over and through obstacles.

Figure 7:
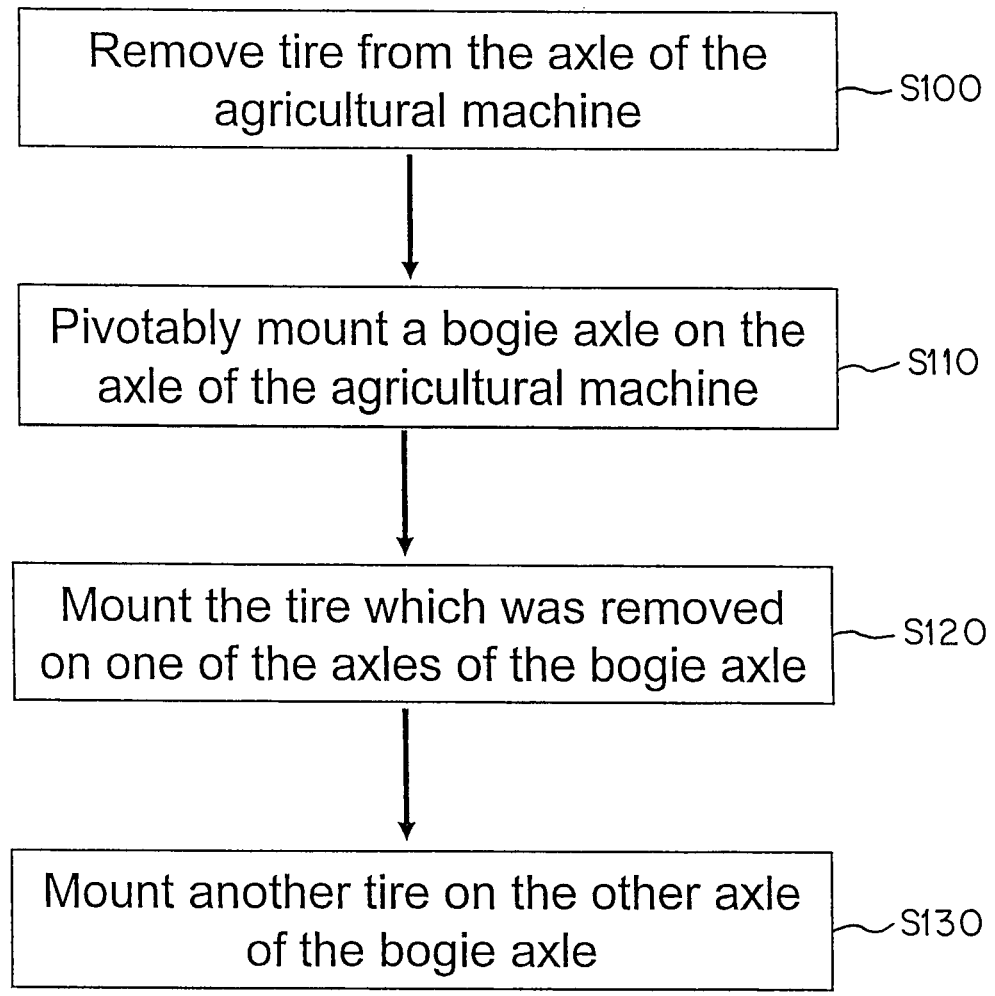
FIG. 7 is a flowchart describing a method of modifying an agricultural machine.
Figure 8:
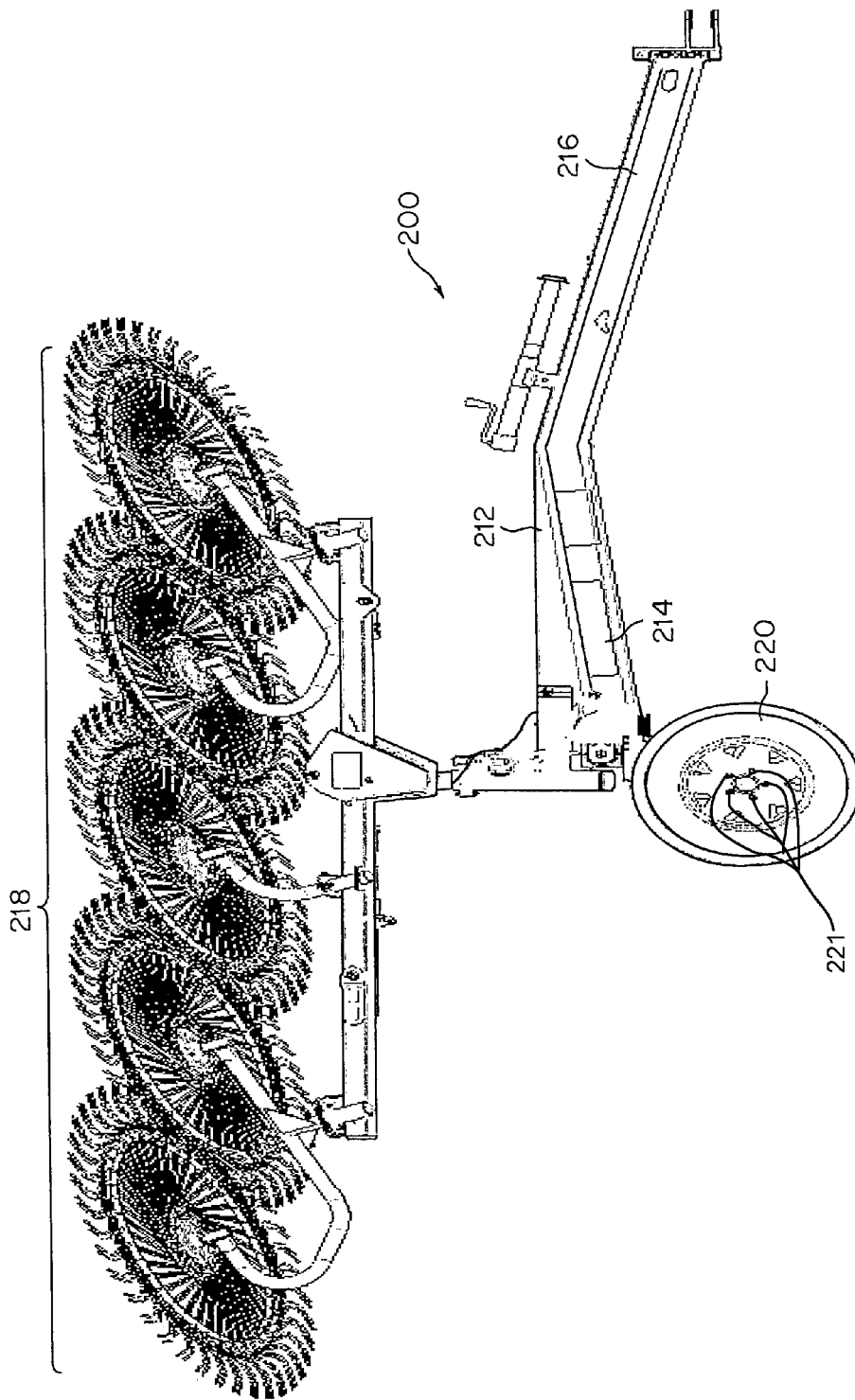
FIG. 8 is a side view of an agricultural machine of the current state of the art.

To improve the travel of the agricultural machine over obstacles, the agricultural machine may be modified from a single axle tire configuration to a bogie axle configuration. In the preferred embodiment discussed above, the size and/or bolt pattern of the hub at the end of the axle of the agricultural machine is the same as the size and/or bolt pattern of at least one of the hub 331 on the front axle 33 or the hub 341 on the rear axle 34 of the bogie axle. A method of modifying the agricultural machine is shown in FIG. 7.

In step 100, the tire from an agricultural machine with a single axle tire configuration may be removed from a hub on an axle of the agricultural machine. In step 110, a bogie axle 30 may be pivotably mounted on the axle. The bogie axle 30 may be either be directed mounted on the axle or mounted on a hub provided on the axle. In step 120, the tire which was removed from the hub on the axle of the agricultural machine may be mounted on either the front hub 331 of the front axle 33 of the bogie axle 30 or the rear hub 341 of the rear axle 34 of the bogie axle 30. In a preferred embodiment, this tire may be mounted on a front hub 331 of the front axle 33 of the bogie axle 30. In step 130, another tire may be mounted on the other of the front hub 331 of the front axle 33 or the rear hub 341 of the rear axle 34 of the bogie axle 30.

In a preferred embodiment, the tire which was first removed from the axle of the agricultural machine is larger than the another tire. In another embodiment, the tire which was first removed from the axle of the agricultural machine is mounted on the front axle 33 of the bogie axle 30.

Accordingly, an agricultural machine may be modified from a single axle tire configuration to a bogie axle configuration. As the tire which was used for in the single axle tire configuration may be mounted on one of the axles 33, 34 of the bogie axle 30, the agricultural machine may be modified by adding new parts without needing to discard anything.

Although the agricultural machine 10 in the shown embodiments is a hay rake, any type of agricultural machine may utilize the bogie axle configuration and the modification method described herein.

Although only certain embodiments of this invention have been described in detail above, those skilled in the art will readily appreciate that many modifications are possible in the exemplary embodiment without materially departing from the novel teachings and advantages of this invention. Accordingly, all such modifications are intended to be included within the scope of this invention.

The invention claimed is:

1. An agricultural machine, comprising:
   a frame including a first axle on a first side of the frame and a second axle on a second side of the frame;
   a rake arm assembly connected to the frame; and
   a bogie axle pivotably mounted on at least one of the first or second axles of the frame, the bogie axle including a body with a front axle disposed at a front end of the body and a rear axle disposed at a rear end of the body,
   wherein a front tire is mounted on the front axle of the bogie axle and a rear tire is mounted on the rear axle of the bogie axle, the front tire being a different size than the rear tire,
   wherein the front tire is larger than the rear tire, and
   wherein the front axle extends from a first side of the body of the bogie axle and the rear axle extends from a second side of the body of the bogie axle, the first and second sides being opposite each other such that the rear tire is closer to the frame than the front tire in a transverse direction.

2. The agricultural machine as claimed in claim 1, wherein at least one of a size or bolt pattern of a hub provided on the at least one of the first and second axles of the frame on which the bogie axle is mounted and at least one of a size or bolt pattern of a hub provided on at least one of the front and rear axles of the bogie axle are the same.

3. The agricultural machine as claimed in claim 1, wherein a bogie axle is mounted on each of the first and second axles, and a width in a transverse direction between the front tires of the bogie axles is greater than a width in the transverse direction between the rear tires of the bogie axles.

4. The agricultural machine as claimed in claim 1, wherein the body of the bogie axle includes a hole provided between the front end and the rear end, through which the bogie axle is mounted on the axle of the frame.

5. The agricultural machine as claimed in claim 4, wherein a bearing is provided in the hole of the body of the bogie axle.

6. The agricultural machine as claimed in claim 1, wherein the bogie axle is mounted to a hub provided on the least one of the first or second axle.

7. The agricultural machine as claimed in claim 6, wherein a plurality of holes corresponding to threaded members provided on the hub is provided in the body of the bogie axle.

8. A method of modifying an agricultural machine including a frame and a rake arm assembly connected to the frame, the method comprising:
   removing a first tire from an axle of the agricultural machine;
   pivotably mounting a bogie axle on the axle of the agricultural machine, the bogie axle including a body with a front axle disposed at a front end of the body and a rear axle disposed at a rear end of the body;
   mounting the first tire on one of the front axle or rear axle of the bogie axle; and
   mounting a second tire on the other of the front axle or rear axle of the bogie axle,
   wherein a size of the first tire is different than a size of the second tire,
   wherein the tire mounted on the front axle is larger than the tire mounted on the rear axle, and
   wherein the front axle extends from a first side of the body of the bogie axle and the rear axle extends from a second side of the body of the bogie axle, the first and second sides being opposite each other such that the tire mounted on the rear axle is closer to the frame than the tire mounted on the front axle in a transverse direction.

9. The method as claimed in claim 8, wherein the first tire is removed from a hub of the axle, and the bogie axle is pivotably mounted on the hub of the axle.

10. A bogie axle comprising:
    a body with a first end, a second end, and a hole provided between the first end and the second end;
    a first axle provided at the first end of the body;
    a second axle provided at the second end of the body;
    a first tire mounted on the first axle; and
    a second tire mounted on the second axle,
    wherein a size of the first tire is larger than a size of the second tire,
    wherein the first axle extends from a first side of the body of the bogie axle and the second axle extends from a second side of the body of the bogie axle, the first and second sides being opposite each other.

* * * * *